Oct. 31, 1944.　　O. J. SUNDSTRAND　　2,361,714
ACCOUNTING MACHINE
Filed June 22, 1939　　7 Sheets-Sheet 1

INVENTOR
OSCAR J. SUNDSTRAND
BY
*L. G. Julihn*
ATTORNEY

Oct. 31, 1944.　　　O. J. SUNDSTRAND　　　2,361,714
ACCOUNTING MACHINE
Filed June 22, 1939　　　7 Sheets-Sheet 2

INVENTOR
OSCAR J. SUNDSTRAND
BY
L. G. Julihn
ATTORNEY

Oct. 31, 1944.  O. J. SUNDSTRAND  2,361,714
ACCOUNTING MACHINE
Filed June 22, 1939  7 Sheets-Sheet 3

INVENTOR
OSCAR J. SUNDSTRAND
BY
*L. G. Julihn*
ATTORNEY

Oct. 31, 1944.   O. J. SUNDSTRAND   2,361,714
ACCOUNTING MACHINE
Filed June 22, 1939   7 Sheets-Sheet 4
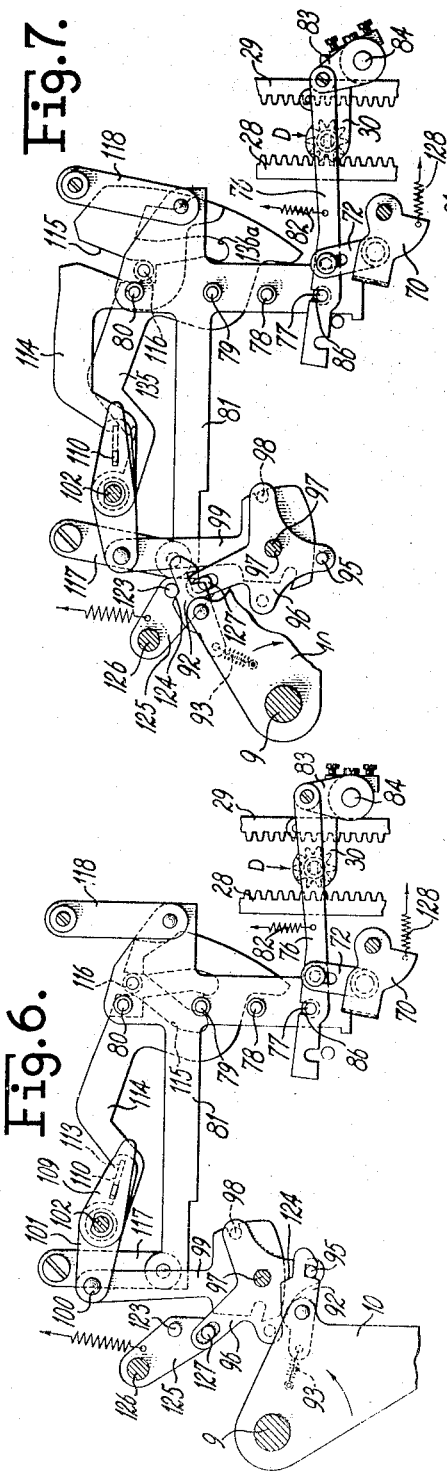
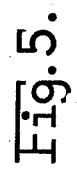
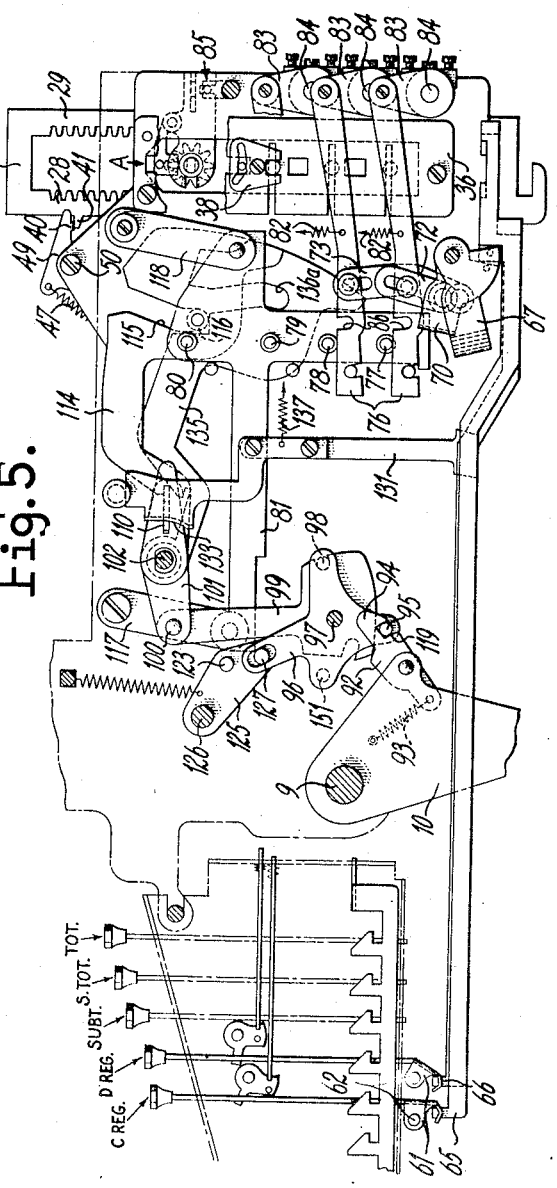
INVENTOR
OSCAR J. SUNDSTRAND
BY
ATTORNEY Oct. 31, 1944. O. J. SUNDSTRAND 2,361,714
ACCOUNTING MACHINE
Filed June 22, 1939 7 Sheets-Sheet 5
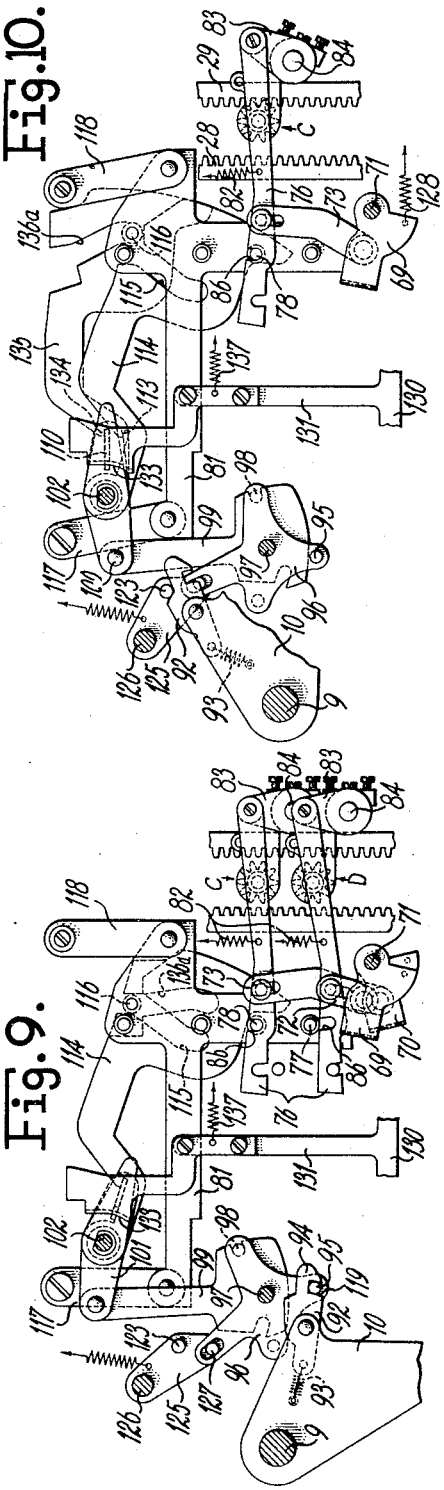
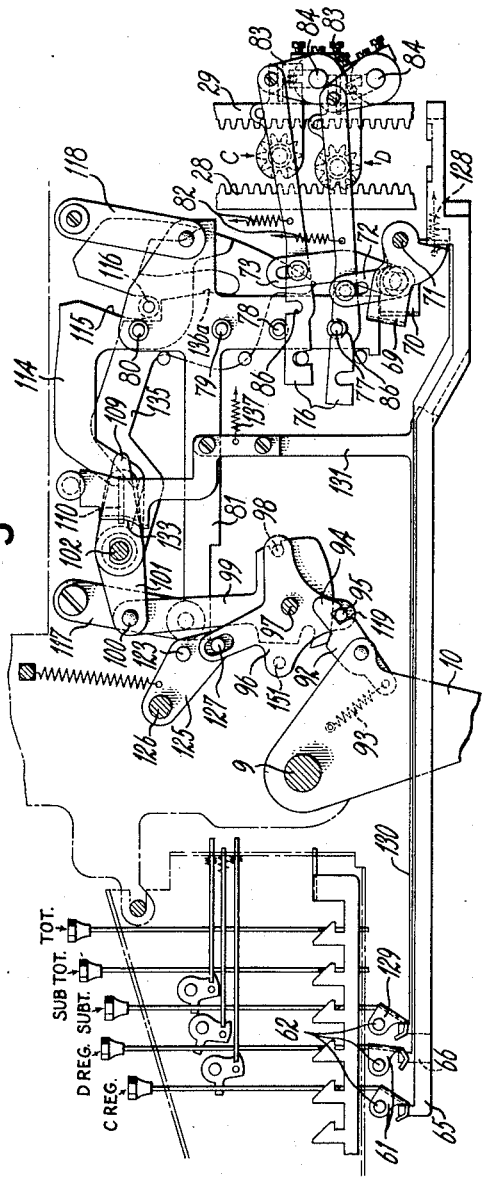
INVENTOR
OSCAR J. SUNDSTRAND
BY
*L. G. Julihn*
ATTORNEY Oct. 31, 1944. O. J. SUNDSTRAND 2,361,714
ACCOUNTING MACHINE
Filed June 22, 1939 7 Sheets-Sheet 6
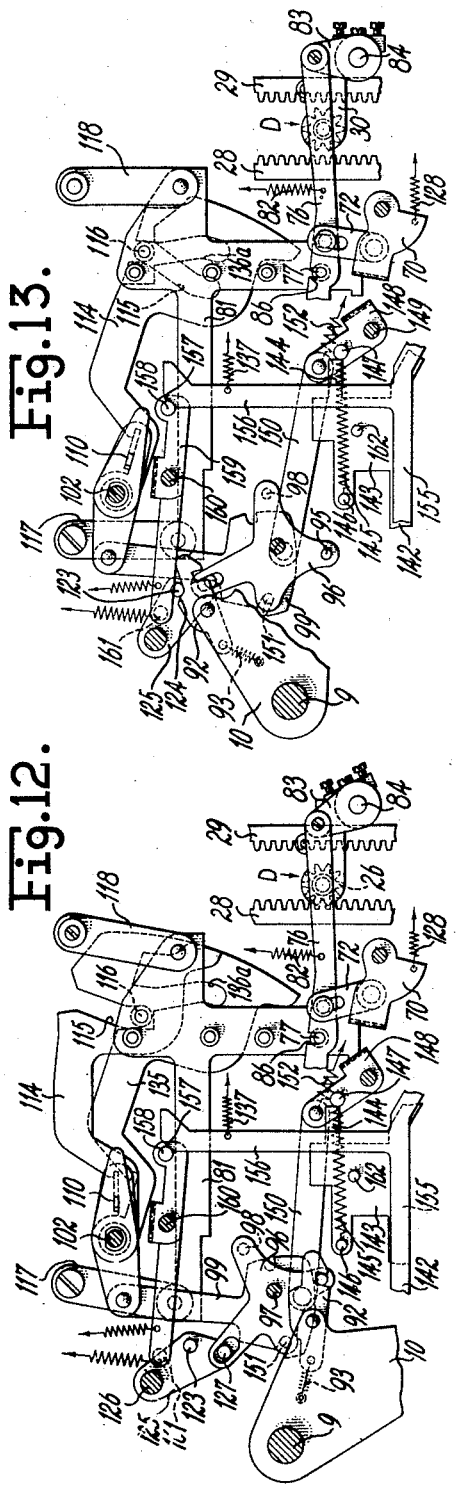
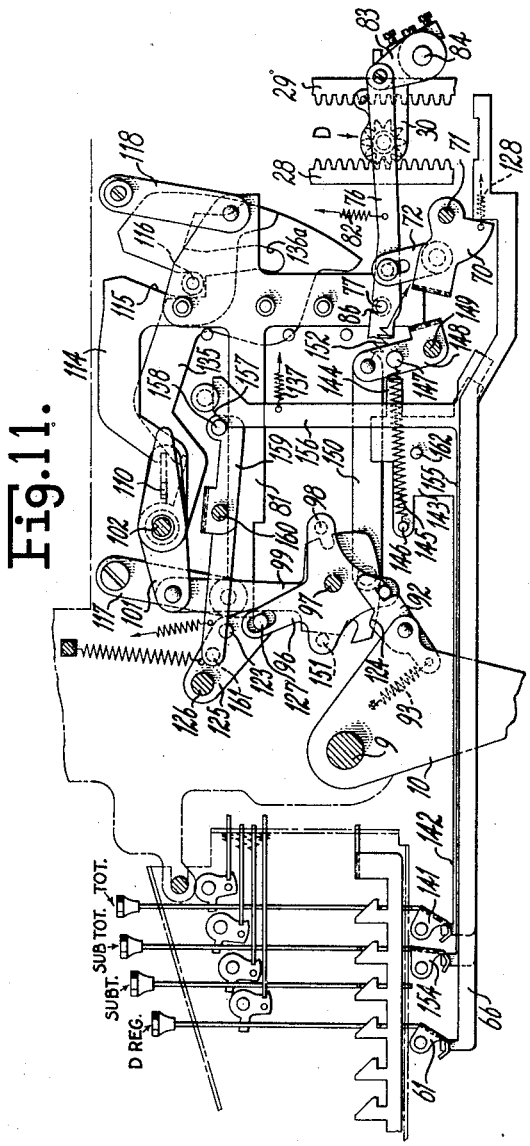
INVENTOR
OSCAR J. SUNDSTRAND
BY
R. G. Julihn
ATTORNEY Oct. 31, 1944.   O. J. SUNDSTRAND   2,361,714
ACCOUNTING MACHINE
Filed June 22, 1939   7 Sheets-Sheet 7

INVENTOR
OSCAR J. SUNDSTRAND
BY
K. G. Julihn
ATTORNEY

Patented Oct. 31, 1944

2,361,714

UNITED STATES PATENT OFFICE 2,361,714

ACCOUNTING MACHINE

Oscar J. Sundstrand, West Hartford, Conn., assignor to Underwood Elliott Fisher Company, New York, N. Y., a corporation of Delaware Application June 22, 1939, Serial No. 280,568

6 Claims. (Cl. 235—60)

This invention relates to accounting machines of the key set, motor operated type, and more particularly to the registers thereof.

Frequently machines of this class employ one or more crossfooters and a plurality of registers, the crossfooters being capable of adding and subtracting, and the registers being capable of adding only.

It is an object of the present invention to provide a means for effecting addition and subtraction in the registers, together with controls therefor, to increase the flexibility of the machine in handling complex types of accounting problems.

Another object is to provide such a means in so simple and compact a form as to require but few additional parts, and but slight additional space in the machine over that occupied by the present register unit.

A further object lies in the provision of a single set of transfer elements common to all the registers and effective for both addition and subtraction to carry from one denominational order wheel to the next higher denominational order wheel.

With these and incidental objects in view, the invention consists in certain novel features of construction and combinations of parts, the essential elements of which are set forth in appended claims, and a preferred embodiment of which is hereinafter described with reference to the drawings which accompany and form part of the specification.

In the drawings:

Figure 1 is a perspective view of an accounting machine embodying the invention, Figure 2 is a diagrammatic view of the keyboard, Figure 3 is a right side elevation showing the adding and subtracting registers, certain of the controls therefor, the type bars and actuating mechanism, Figure 4 is a detail perspective view of the adding and subtracting registers including the transfer mechanism, Figure 5 is a right side elevation showing one of the registers about to be selected for an adding operation, Figure 6 is a view similar to Figure 5 but showing the register selected, Figure 7 is a view similar to Figure 6 but showing the register engaged for the adding operation, Figure 8 is a view similar to Figure 5 but showing a different register about to be selected for a subtracting operation, Figure 9 is a view similar to Figure 8 but showing the register selected, Figure 10 is a view similar to Figure 9 but showing the register engaged for the subtracting operation, Figure 11 is a right side elevation similar to Figure 8 but showing the parts in the position they occupy at the end of a blank cycle during which a register has been selected and engaged preparatory to taking a total, Figure 12 is a view similar to Figure 11 but showing the parts in the positions they occupy shortly after the beginning of the total cycle, Figure 13 is a view similar to Figure 12 but showing the parts in the positions they occupy shortly after the middle of the total cycle, Figure 14 is a view similar to Figure 13 but showing the parts in the positions they occupy shortly after the middle of the sub-total cycle, Figure 15 is a fragmental perspective of certain parts of the register adding and subtracting selective control mechanism, and Figure 16 is a fragmental perspective of certain parts of the register selecting mechanism.

GENERAL DESCRIPTION

This machine is an improvement on my pending application Serial No. 581,800 now Patent No. 2,194,270. The machine includes the customary keyboard with amount keys, date keys and operation controlling keys. It has the customary traveling paper carriage that is automatically tabulated from column to column. The carriage includes a control plate carrying a series of magazines having lugs for automatically controlling the various operations of the machine that may be initiated manually by the keyboard. The machine includes four adding and subtracting registers in addition to the usual crossfooter, this latter being omitted in the drawings since it has no particular bearing on the present invention.

All of the registers and the crossfooter are actuated by a common set of actuators adjustable under control of stops set by the amount keys. These actuators also control the adjustment of type for printing amounts and totals.

The registers are mounted one above the other, and are operated by racks connected to the actuators and having two sets of teeth. A single set of transfer elements, common to all of the registers, is arranged to effect a transfer from one denominational order to the next higher denominational order, whether the necessity for such transfer arises from an adding or a subtracting operation. Selection of the registers may be performed manually by depressing one of four register keys, or automatically by the depression of control levers by the carriage control lugs.

Totals are taken from the registers by operating the machine through a blank cycle, during which the selected register is engaged with the adding side of the racks, and then by depressing the Register Total Key (or by operating the corresponding carriage control) and again cycling the machine.

Sub-totals are taken from the registers in the same manner except that the Register Sub-Total Key is operated instead of the Register Total Key.

Subtraction in a register is accomplished in substantially the same manner as addition, except that the Register Subtract Key (or its corresponding automatic carriage control) is actuated before the machine is cycled, to engage the selected register with the subtracting instead of the adding side of the racks.

DETAILED DESCRIPTION

INDEX OF TOPICS

1. The machine sections and actuating mechanism.
2. Adding and subtracting registers—in general.
3. Transfer mechanism.
4. Selection of the registers.
5. Engagement of the registers for an adding operation.
6. Engagement of the registers for a subtracting operation.
7. Actuation of the registers.
8. Taking totals from the registers.
9. Taking sub-totals from the registers.

1. The machine sections and actuating mechanism

Figure 1:
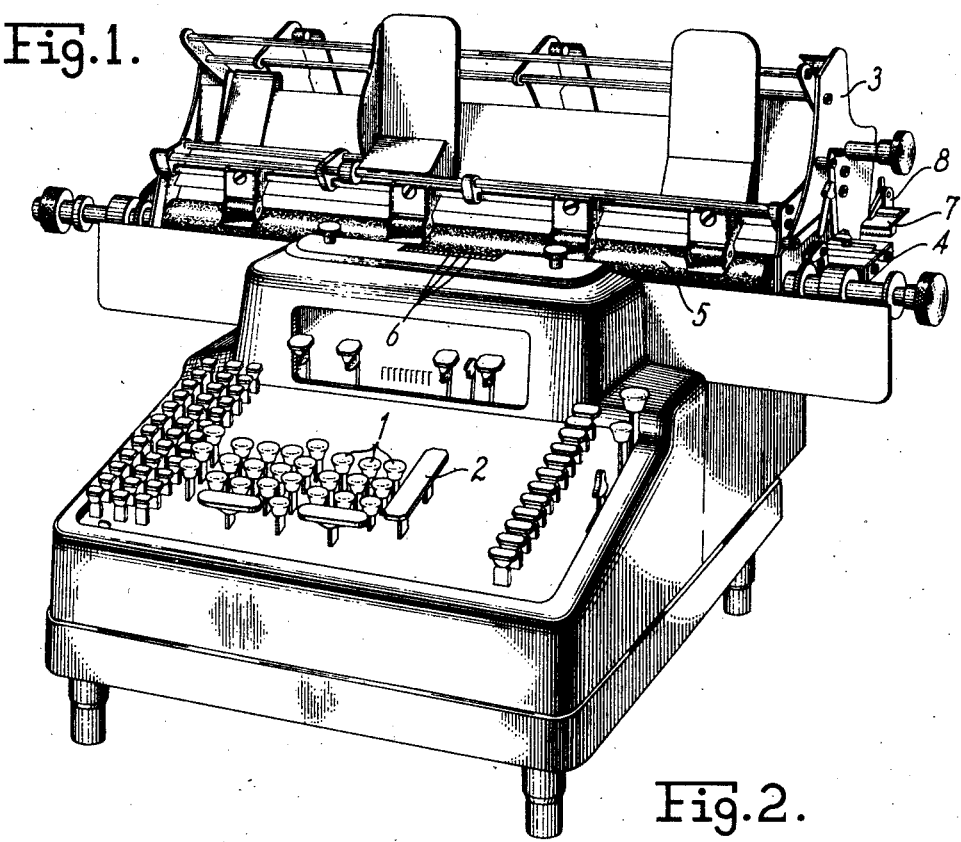

Referring to Figure 1, the machine includes the customary keyboard having amount keys 1 and a motor bar 2, a paper carriage 3, laterally movable along a track 4 and carrying a roller platen 5, around which paper is inserted for printing by type bars 6, and a plate 7 fixed on the carriage, having a plurality of control magazines 8 for automatically controlling various machine operations as the carriage tabulates from column to column.

Figure 3:
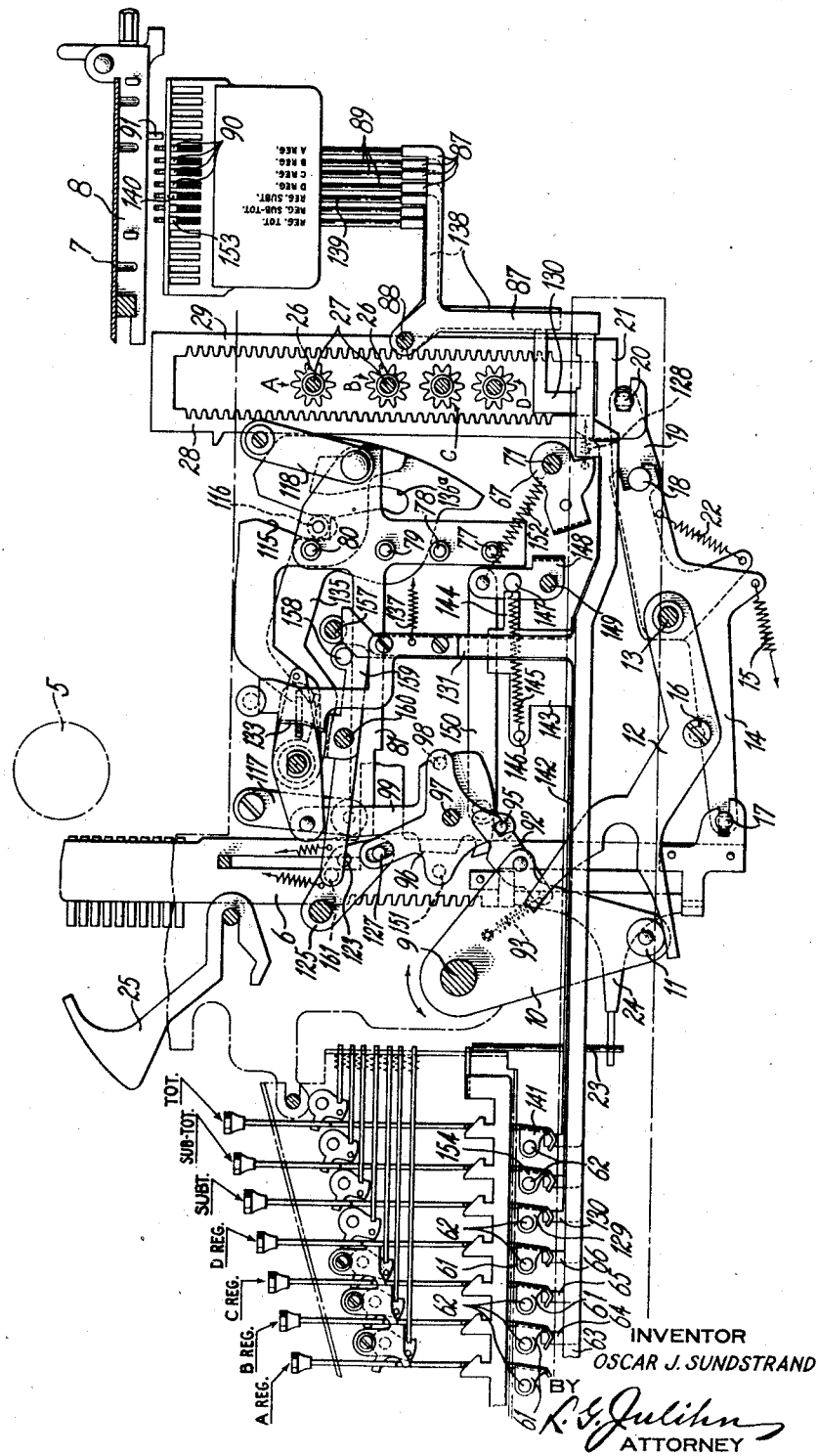

The machine also has four registers designated A, B, C and D in Figure 3. Each register is comprised of a plurality of ten tooth wheels, and each is operable for addition and subtraction.

Situated in front of the registers is a crossfooter (not shown) having a plurality of twenty tooth wheels, and likewise capable of both addition and subtraction. This crossfooter and its operating mechanism is identical with that disclosed in the before-mentioned application Serial No. 581,800.

The machine is operated by an actuating shaft 9 that is connected to an electric motor drive in such a manner that the shaft is rocked, first, counter-clockwise, and then, clockwise, during each cycle of the machine. The motor (not shown) is started by closing suitable switch mechanism under control of Motor Bar 2, or a corresponding carriage control lever. Simultaneously, the motor drive is coupled with the shaft 9 by suitable clutch mechanism to initiate the above described oscillatory movement of the shaft.

Two similar arms 10, only one of which is shown, are secured to drive shaft 9, and are each provided with rollers such as 11 that rest in cam slots in the forward ends of two similar arms such as 12, pivoted on a rod 13 and situated on opposite sides of type bars 6. A series of actuating levers such as 14, there being a lever for each type bar, are pivoted on rod 13 between arms 12, and are tensioned clockwise about the rod by springs such as 15 so that the upper edges of the levers rest against a tie-rod 16 secured between arms 12. The forward ends of levers 14 are each pivoted at 17 to their corresponding type bars 6, which are guided for vertical movement in the machine frame. The rear end of each lever 14 is connected by pin-and-slot connection 18 to a bell crank 19, also pivoted on rod 13 adjacent each actuating lever. The rear ends of bell cranks 19 are pivoted at 20 to corresponding register actuating racks 21, guided for vertical movement in the machine frame. Springs such as 22, connected between each bell crank and lever, normally tension the bell cranks counter-clockwise about rod 13 so that the pins of pin-and-slot connections 18 are urged toward the upper edges of the slots for transfer purposes to be later described.

Operation of the machine causes arms 10 and 12 to be raised and lowered during each cycle. As rod 16 rises during the first half of the cycle, actuators 14 raise such of the type bars 6 as are free to rise under tension of springs 15, and the corresponding actuating racks 21 are simultaneously lowered. As rod 16 descends, during the second half of the cycle, the actuators are restored, restoring the type bars and racks to the normal position shown in Figure 3.

The extent of vertical movement of the type bars and racks is controlled by stops (not shown) that are moved by amount keys 1 (Figure 1) into the path of vertically disposed rods 23, connected to the forward ends of arms 24 of type bars 6. Printing is effected by hammers 25 that are tripped to strike impression type carried by the type bars shortly after all the bars have risen to their fullest extents as determined by the amount indexed on the keyboard.

2. ADDING AND SUBTRACTING REGISTERS—IN GENERAL

Figure 4:
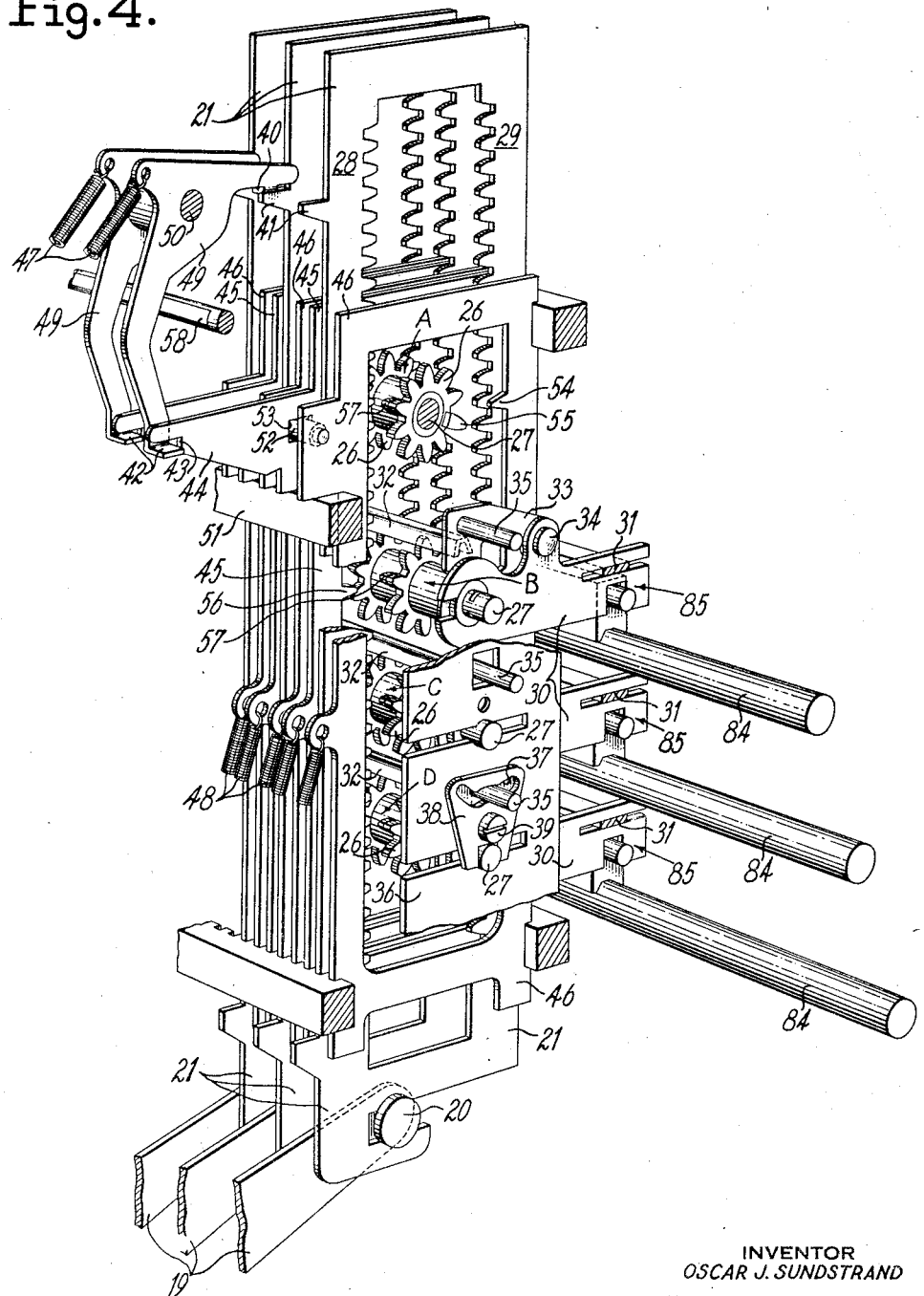

The registers A, B, C and D (Figure 4) are each composed of a number of ten tooth wheels 26 rotatably mounted on shafts 27. Shafts 27 are situated one above the other and extend between the adding side 28 and the subtracting side 29 of racks 21, and are mounted at their opposite ends i brackets such as 30, slidably mounted for horizontal movement on cross bars 31 fixed in the machine frame. Wheels 26 are normally held in neutral position, out of mesh with the racks, and are engageable with either side of the racks by shifting the registers bodily into mesh therewith. The wheels are held against improper rotation while in neutral position by detents such as 32 (best shown in connection with the B register). These detents are connected between arms such as 33 pivoted at 34 on brackets 30. Each right arm 33 carries a pin 35 that extends through an aperture in a stationary plate 36 into a slot 37 (see the D register) in a cam 38 pivoted at 39 on plate 36. The lower ends of cams 38 are slotted to receive the ends of shafts 27. Cam slots 37 are so shaped that when the registers are in neutral position, detents 32 are cammed downwardly into engagement with the wheels to prevent improper rotation. When the register is shifted to engage either side of the racks, oscillation of cam 38 about pivot 39 incident to such shifting, cams the detents upwardly out of engagement with the wheels, leaving them freely rotatable by whichever side of the racks they have engaged.

3. TRANSFER MECHANISM

A single set of transfer elements common to all of the registers is arranged to effect a carry of "1" from a wheel of lower order to the wheel of next higher order.

As before stated, bell cranks 19 (Figure 3) are normally tensioned counter-clockwise about rod 13 by springs 22, urging the pins of the pin-and-slot connections 18 upwardly toward the upper edges of the slots. These slots are of sufficient width to permit an additional one tooth step of movement to the corresponding rack 21 of each bell crank 19 under the tension of springs 22. All of the racks are restrained from this additional step of movement by bell cranks 49 (Figure 4) pivoted at 50.

The horizontal arms on each of these bell cranks have flanges 40 that engage lugs 41 on each rack of the next higher order, and the vertical arms of the bell cranks have flanges 42 that engage shoulders 43 formed on extensions 44 of slides 45, there being a slide 45 and another slide 46 for each denominational order. Springs 47 tension bell cranks 49 counter-clockwise about pivot 50 and flanges 42 against shoulders 43, in which position flanges 40 restrain racks 21 of the next higher order from rising the additional step of movement. The units rack is held permanently against this additional step of movement by any suitable means such as the stationary element 362 disclosed in application Serial No. 581,800.

Weak springs 48, connected individually to each of the slides 45 and 46, tension the slides downwardly against a cross bar 51, in which position shoulders 43 lie in the plane of flanges 42. Each pair of slides 45 and 46 is connected for parallel uniform movement by a pin 52 fixed in one slide and extending into an opening 53 in the other. Each slide 46 has inwardly projecting lugs such as 54 on one side thereof opposite each register, and each slide 45 has similar inwardly projecting lugs such as 56 on the opposite side of the slide opposite each register. The lugs 54 are engageable by transfer lugs such as 55 on one face of each register wheel 26, and the lugs 56 are engageable by transfer lugs such as 57 diametrically opposite to lugs 55 and on the opposite face of each register wheel 26.

Addition and subtraction in the registers is effected on the up-stroke of racks 21, hence when the register is engaged with adding side 28, wheels 26 are rotated clockwise, whereas when the register is engaged with the subtraction side 29, the wheels are rotated counter-clockwise. When transfer lug 57 rests immediately above its corresponding lug 56, wheels 26 are at "0". Addition of an amount in a register sufficient to rotate any wheel clockwise from "9" to "0" causes its lug 57 to engage its corresponding lug 56 and raise slide 45 to remove shoulder 43 from behind flange 42, whereupon bell crank 49 rocks counter-clockwise, allowing the next higher order rack 21 to rise the additional step of movement to rotate the next higher order wheel a distance of one tooth to effect the transfer additively.

Similarly, subtraction of an amount sufficient to rotate a wheel 26 counter-clockwise from "0" to "9" causes its lug 55 to engage its corresponding lug 54 and raise slide 46, which, through its connection with slide 45, raises this slide also to effect a transfer subtractively in the same manner as above described in connection with an adding operation.

This transfer movement occurs toward the end of a machine cycle, the transfer mechanism and racks being reset to their initial position at the beginning of the next cycle by a cross bar 58, arranged to swing bell cranks 49 clockwise sufficiently to restore the racks and to cause flanges 42 to again engage shoulders 43 of the slides, the latter descending under tension of springs 48. Cross bar 58 corresponds to the cross bar 370 in the previously mentioned application Serial No. 581,800, and the resetting mechanism is identical with that disclosed in that application.

4. Selection of the Registers

Figure 2:
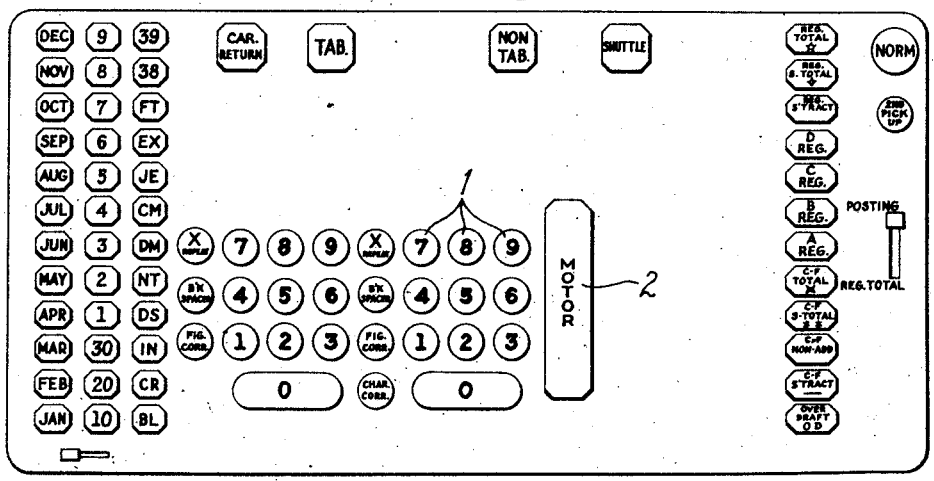

The registers may be selected manually or automatically. Manual selection of the registers is accomplished by depressing one of four keys designated A register, B register, C register and D register, in Figures 2 and 3.

Figure 16:
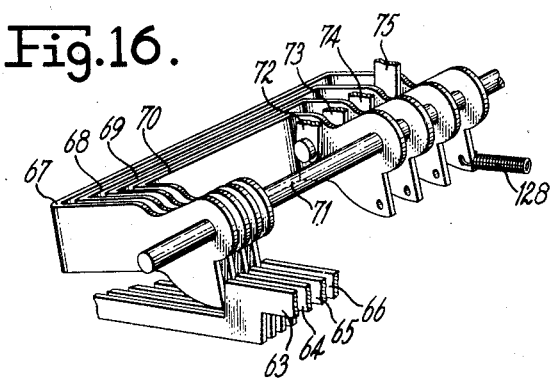

Referring particularly to Figure 3, four bails 61 are pivoted on rods 62, and lie directly beneath the stems of the Register Selecting Keys. The lower portions of these bails are slotted to receive upstanding projections of slides 63 to 66 extending to the rear of the machine. At their rear ends the slides 63 to 66 have upstanding projections lying directly behind downwardly extending shoulders on bails 67 to 70 (Figure 16) pivoted on a rod 71. At their opposite sides, the bails 67 to 70 have pivoted thereto four links 72 to 75, which in turn are each pivoted to engaging links such as 76 (Figure 5), there being an engaging link for each register.

As shown in Figure 5, there is a pin-and-slot connection between each of the links 72 to 75 and its corresponding engaging link 76, to provide for a movement of any of the links 72 to 75 without a corresponding movement of the engaging links.

By the train of connections just described, depression of one of the Register Selecting Keys A to D oscillates one of the bails 61 clockwise and pulls one of the slides 63 to 66 forward. This rocks the corresponding bail 67 to 70 clockwise and raises the corresponding link 72 to 75. Four studs 77 to 80 are secured to a member 81 held against vertical movement in a manner to be later explained. Springs such as 82 are connected to each engaging link and to the machine frame to tension the forward ends of the links upwardly. The rear ends of the engaging links are pivoted to arms 83, secured to shafts 84 (see also Figure 4) that are connected by pin-and-slot connections 85 to sliding brackets 30 of each register.

From this construction, it is seen that when one of the links 72 to 75 is raised by depression of its Register Selecting Key, the corresponding engaging link 76 will be free to move up a short distance under the tension of its corresponding spring 82, when studs 77 to 80 are moved into alignment with notches 86 provided in engaging links 76.

Automatic selection of the registers is controlled by magazines such as 8 (Figure 3) secured on the carriage control plate 7. The rear end of each slide 63 to 66 rests in front of a depending arm of a bell crank such as 87 pivoted at 88 and having a horizontal arm supporting a pin such as 89, guided for vertical movement in the machine frame. The upper end of each pin 89 rests beneath a selector lever 90 extending transversely of and pivoted in the machine frame, there being a separate selector lever for each register. The construction and operation of these automatic selector levers is disclosed in detail in the before-mentioned application Serial No. 581,800. Suffice it, therefore, to say that when a magazine 8 in a given columnar position contains a lug such as 91 to select a particular register, its corresponding lever 90 is depressed, rocking its bell crank 87 clockwise and thrusting the corresponding slide 63 to 66 forward the same as when the Register Key for that particular register is depressed, as above described.

5. Engagement of the registers for an adding operation

To facilitate an understanding of the selection and subsequent engagement of a register, we will consider that the D Register Key has been depressed, as shown in Figure 5, for the selection of the D register, and proceed to show, step by step, how the selection of this register is completed and how it is engaged for an adding operation.

Referring to Figure 5, the right arm 10 has pivoted thereto a pawl 92 tensioned clockwise from its position in Figure 5 by a spring 93. A hook 94 is provided on the rear end of the pawl, and embraces a stud 95 when the machine is at rest. The stud 95 is carried by a plate 96 pivoted on a stationary stud 97. Another stud 98 is secured to plate 96 and lies within a notch in the rear edge of a pendant 99 during accumulating operations. Pendant 99 is pivoted at 100 to a lever 101, pivoted on a stationary rod 102.

Figure 15:
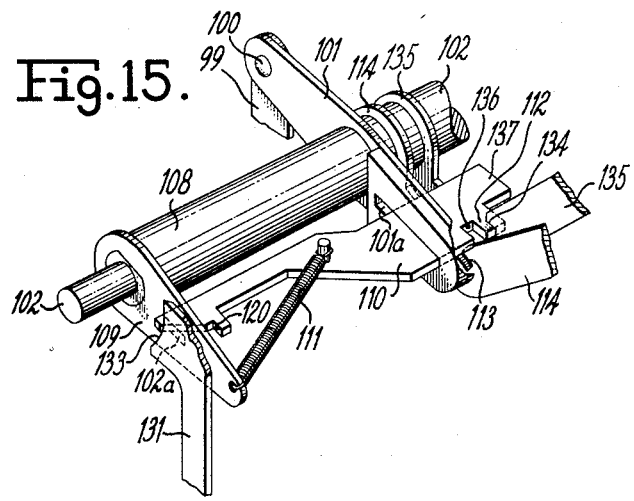

Referring to Figure 15, lever 101 is connected by a sleeve 103 to an arm 109, the lever and arm each having a slot 101a and 102a respectively, in which is slidably mounted a cam selecting key 110 normally tensioned by a spring 111 toward the left from the position shown in Figure 15, so that a shoulder 120 on the key adjacent arm 109 abuts the arm. In this position, a tongue 112, provided on the opposite end of the key, rests within a slot 113 in an adding cam lever 114 pivoted on rod 102 adjacent lever 101. The rear end of cam 114 (Fig. 5) is provided with a cam slot 115 embracing a stud 116 on member 81. This member is mounted for horizontal movement forwardly and rearwardly of the machine by being suspended from the machine frame on two links 117 and 118 pivoted to the front and rear ends of member 81 and to the machine frame. As heretofore mentioned, studs 77 to 80 are secured in member 81 to move forwardly and rearwardly of the machine with the member.

When the machine begins an operation, counter-clockwise movement of arm 10 causes a shoulder 119 on pawl 92 to push stud 95 a short distance to the rear, as shown in Figure 6. This movement, and the accompanying movement of plate 96 and stud 98, raises pendant 99 and lowers the Cam Selecting Key 110, which, being in engagement with slot 113 of the adding cam 114, lowers the rear end of the cam, causing cam slot 115 to shift member 81 to the rear, as shown in Figure 6, so that notch 86 in engaging link 76 (in this instance, engaging link 76 for the D register) may rise under the tension of its spring 82 to engage pin 77, completing the selection of the register. As soon as actuating arm 10 rises to the point where spring 93 no longer rotates pawl 92 with relation to arm 10, pawl 92 moves away from stud 95, the parts 96, 99, 114, 81, etc., remaining in their moved positions during the remainder of the counter-clockwise movement of arm 10.

Just before arm 10 completes its counter-clockwise movement, the forward edge of pawl 92 strikes a stud 123, so that continued movement of arm 10 tensions spring 93 and rotates pawl 92 clockwise with respect to arm 10. When arm 10 has reached its extreme counter-clockwise position, a shoulder 124 on pawl 92 lies substantially in front of stud 123.

At the beginning of the return or clockwise oscillation of arm 10, pawl 92 moves stud 123 upwardly and to the rear, causing arm 125, on which stud 123 is mounted, to move counter-clockwise about its pivot 126. This moves stud 127, also secured to arm 125, in a corresponding direction, and since stud 127 lies within a slot in an arm on plate 96, moves plate 96 clockwise about its pivot 97. It must be remembered that this movement of plate 96 takes place at the very beginning of the return oscillation of arm 10.

Such movement of plate 96 lowers stud 98 and thereby raises the rear end of adding cam lever 114, to move member 81 to the left, as shown in Figure 7. Since the selecting link 76 for the D register is now in its upper position, the forward movement of member 81 pulls this link forward, which in turn rocks arm 83 and shaft 84 counter-clockwise to shift the D register into engagement with the adding side 28 of the racks 21, as shown in Figure 7.

During the remainder of return movement of arm 10, the parts 96, 99, the engaging links, etc., are not moved, so that at the end of the operation the register selected and engaged for that operation (in this instance, the "D" register) remains engaged, as shown in Figure 8.

At the beginning of the next operation, the initial counter-clockwise movement of plate 96 disengages the "D" register by movement of its engaging link 76 to the rear, as shown in Figure 9. If this register is not again selected for this cycle, as soon as the engaging link reaches its neutral position, one of four strong springs 128, attached to the bails 67 to 70 (Figure 16) and to the machine frame, pulls its corresponding bail counterclockwise about its pivot 71. At this time the bail is free to be rocked in this direction, since its corresponding slide 63 to 66 is not pulled forward during this operation by depression of its corresponding Register Key or pushed forward by its corresponding automatic selector lever.

6. Engagement of the registers for a subtracting operation

Subtraction in the registers may be controlled manually by a Subtraction Key, or automatically by the corresponding automatic carriage control.

We will now consider that the C Register Selecting Key and the Subtraction Key are depressed jointly, as shown in Figure 8, to effect a subtraction operation in the C register following the adding operation in the D register as above described.

Referring to Figure 8, a bail 129 similar to bails 61, pivoted on a rod 62, lies directly beneath the stem of the Subtraction Key. A slide 130, connected to bail 129, carries an upstanding projection 131, having a beveled edge 133 (see also Figure 15) arranged to engage a beveled surface on key 110. Depression of the Subtraction Key rocks bail 129 clockwise, pulling slide 130 forward and causing beveled edge 133 to cam key 110 toward the right, to the position shown in Figure 15, shifting tongue 112 out of engagement with slot 113 of add cam 114 to a position directly above a slot 134 in a subtracting cam lever 135 pivoted on rod 102 adjacent cam 114. When key 110 is so moved, a notch 136 therein is brought into alignment with slot 113 of cam lever 114.

Now, at the start of the machine cycle, as pendant 99 is raised, the body portion of key 110 behind notch 136 rocks add cam 114 downwardly about shaft 102, thrusting the D register to neutral position, as shown in Figure 9. During this downward movement, tongue 112 rides against the upper edge of cam 135, and cams the right end of key 110 toward shaft 102, against the tension of spring 111, slot 101a being sufficiently wide to permit of this movement, so that, upon the completion of the up-stroke of the pendant 99, tongue 112 engages in slot 134 under tension of spring 111. At this point in the cycle, the D register selecting link, which was left in engagement with stud 77 at the end of the preceding adding operation, is disengaged as above described, and the selecting link of the C register is free to rise so that its notch 86 engages stud 78, as shown in Figure 9.

Now, at the beginning of the return or clockwise oscillation of arm 10, as pendant 99 is lowered to the position shown in Figure 10, the rear end of lever 135 is raised instead of lever 114. This causes a cam slot 136a to engage stud 116 and thrust member 81 toward the right (Figure 10), and since the C register link 76 is in engagement with stud 78, the rearward movement of member 81 thrusts the link rearwardly, which in turn rocks arm 83 and shaft 84 clockwise to engage the C register with the subtraction side 29 of racks 21, as shown in Figure 10. At the end of the cycle, the Subtraction Key and slide 130 restore, allowing spring 111 to restore key 110 to the left (Figure 15).

If, upon the next operation of the machine, the Subtraction Key is not again depressed, key 110 remains at the left. In this position, tongue 112 lies above slot 113 in adding cam 114, and a projection 137 on the right end of the key lies over a portion of subtract cam 135 immediately behind slot 134, so that during this operation, as lever 101 rocks clockwise, projection 137 moves cam 135 downwardly about shaft 102, tongue 112 engaging slot 113 in cam 114 as the clockwise movement is completed. When lever 101 moves counterclockwise during the latter half of this cycle, cam 114 is raised to engage the selected register with the adding side 28 of racks 21.

Subtraction slide 130 may be automatically controlled by magazines 8 on the carriage by the following construction. A bell crank 138 (Figure 3), similar to bell cranks 87, is pivoted at 88, and has a depending arm resting against the rear end of subtraction slide 130. A pin 139 extends between a selector lever 140, similar to selector levers 90, and a horizontal arm of bell crank 138. It is apparent that when the carriage advances to a columnar position where a magazine 8 contains a lug to depress the selector 140, bell crank 138 rocks clockwise about pivot 88, pushing slide 130 forward the same as though the Subtraction Key were depressed.

7. Actuation of the registers

Actuation of the registers occurs during the latter half of the machine cycle, the engagement of the registers taking place just after racks 21 are lowered.

As before stated, the amount of movement imparted to the racks is determined by stops set by indexing an amount in the keyboard. When a register is engaged with the adding side 28 of racks 21, its wheels 26 are rotated clockwise as the racks rise, and conversely when a register is engaged with the subtraction side 29, its wheels 26 are rotated counter-clockwise.

8. Taking totals from the registers

Totals may be taken from the registers manually by the depression of the Register Total Key, or automatically by operation of a corresponding carriage control.

When it is desired to take a total from one of the registers, it is first necessary to operate the machine through a blank cycle to restore any transfer elements that may have been released during the preceding cycle, and to engage the register from which the total is to be taken. To do this it is only necessary to depress the proper Register Selecting Key and operate the machine. As explained above, this will leave the register engaged at the end of the operation, and for purposes of illustration we will consider that the D register has been so engaged, as shown in Figure 11.

The Register Total Key stem rests on a bail 141 similar to bail 129. A slide 142 is mounted for forward and rearward movement similarly to slide 130, and has an upwardly extending portion 143 with a rearwardly extending arm 144. A spring 145 is secured to a stud 146 on the portion 143 and to a stud 147 on a bail 148 pivoted on a rod 149.

A link 150, pivoted at one end to an arm of bail 148 and at its opposite end to pendant 99, connects the bail and pendant for uniform movement. When the Register Total Key is not depressed, as shown in Figure 3, slide 142, bail 148 and link 150 lie in their rear positions, holding pendant 99 in engagement with stud 98.

Depression of the Register Total Key moves slide 142 forward, stretching spring 145, as shown in Figure 11. This movement of slide 142, through spring 145, pulls bail 148, link 150, and pendant 99 forward, until the forward edge of the pendant rests against a stud 151 on plate 96. This movement is sufficient to disengage the notch in the rear edge of the pendant from stud 98. Slide 142, however, is moved forward an additional distance sufficient to allow pendant 99 to move still farther forward as soon as stud 151 is lowered to a position opposite a notch in the forward edge of pendant 99.

Now, upon operation of the machine, counterclockwise movement of plate 96 at the very beginning of the operation, lowers stud 151, as just mentioned, to a position opposite the notch in the forward edge of the pendant, at which time spring 145 moves pendant 99 forward, engaging the notch on the stud. It will be noted that this counter-clockwise movement of plate 96 did not raise pendant 99 since stud 98 was disengaged from its notch by the initial forward movement of the pendant. Actuating arms 10 then complete their counter-clockwise movement, with the D register remaining in its engaged position, as shown in Figure 12.

As explained in the previously mentioned application Serial No. 581,800, when a register is in engagement with the actuating racks, during the initial stroke of arms 10, the total is taken from the register wheels and printed, the transfer lugs on the register wheels arresting movement of the actuating racks 21 as soon as the respective register wheels reach zero. At the beginning of the return stroke of arms 10, shoulder 124 on pawl 92 raises stud 123, as in accumulating operations, rotating arm 125 clockwise and raising pendant 99, as shown in Figure 13. This lowers cam slot 115 and moves member 81 to the rear, disengaging the selected (D) register. This takes place after the total is printed and before actuating racks 21 start their return movement. During the remainder of the return stroke of arms 10, racks 21 return to their normal positions.

At the very end of the operation when the Total Key is released, in the manner explained in application Serial No. 581,800, a spring 152 pulls pendant 99 to the rear, disengaging it from stud 151, bringing the rear edge of the pendant against stud 98.

It will be noted that this is not the normal position of pendant 99 shown in Figure 5. The pendant, however, returns to its normal position during the next cycle. In this next cycle, the initial counter-clockwise movement of plate 96 raises stud 98 until it is opposite its notch, at which time spring 152 engages it therewith. The pendant is then in position to be returned to its normal position when shoulder 124 raises stud 123 at the beginning of the return movement of arms 10.

Totals may be taken automatically under the control of magazines 3 on control plate 7 by a suitable train of connections similar to those described in connection with the register subtracting mechanism, and operable by an automatic selector lever 153 (Figure 3).

9. Taking sub-totals from the registers

Sub-totals may be taken from the registers manually by the depression of the Register Subtotal Key, or automatically by operation of a corresponding carriage control.

After a blank cycle has been taken to engage the register from which the sub-total is to be taken, the Sub-total Key is depressed. The Sub-total Key stem rests on a bail 154 similar to bail 141. A slide 155 is mounted for forward and rearward movement similarly to slide 142, and has an upstanding arm 156 (Figure 11) having a cam surface 157 contacting a stud 158 on the rear arm of a bail lever 159 pivoted on a rod 160. A stud 161 is secured to the forward end of lever 159 and lies in the vertical plane of stud 123. A stud 162, fixed on portion 143 of slide 142, lies in front of arm 156, so that when the Register Sub-total Key is depressed to pull slide 155 forward, arm 156 engages stud 162 and pulls also slide 142 forward to shift pendant 99. This forward movement also causes cam surface 157 to lift stud 158 and lower stud 161.

Figure 14:
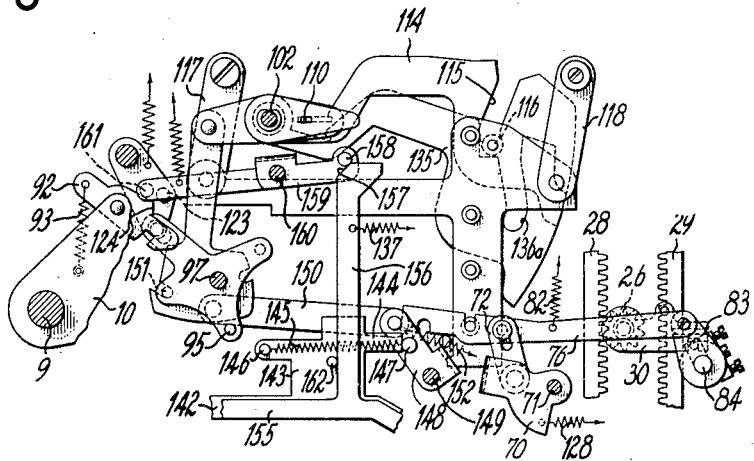

Now, upon operation of the machine, when shoulder 124 of pawl 92 would normally engage stud 123, at the beginning of the second half of the cycle, the presence of stud 161 prevents shoulder 124 from so engaging the stud, as shown in Figure 14. Therefore, instead of pawl 92 swinging stud 123 upwardly to disengage the selected (D) register before the actuating racks return, it rides idly under the stud, leaving the selected register engaged until after the actuating racks have returned. Hence, the amount that was in the register is returned thereto.

Mechanism similar to that described in application Serial No. 581,800 is provided to effect automatic operation of sub-total slide 155 under control of the paper carriage.

Although reference to application Serial No. 581,800 is given a number of times in the preceding description, it is not given in every instance where a more complete reference to many of the parts may be found. It is, therefore, to be understood that wherever the disclosure is inadequate for a complete understanding of the invention, such reference should be resorted to.

While the form of mechanism herein shown and described is admirably adapted to fulfill the objects primarily stated, it is to be understood that it is not intended to confine the invention to the one form of embodiment herein disclosed, for it is susceptible of embodiment in various forms, all coming within the scope of the claims which follow.

What is claimed is:

1. In an accounting machine, the combination of a totalizer shiftable from a neutral position to an add position or to a subtract position, two oscillatable cams, means operatively connecting said totalizer to said cams so that oscillation of one cam shifts the totalizer between neutral and add positions and oscillation of the other cam shifts the totalizer between neutral and subtract positions, an oscillatable cam operator, a member between said operator and cams shiftable to enable the movement of said operator in one direction of oscillation to move one or the other cam in one of its directions and capable, irrespective of the shift, of engaging both cams to enable the movement of the operator in the opposite direction of oscillation to move either cam in the other one of its directions.

2. In a machine of the class described having a totalizer movable into adding or into subtracting positions; means to shift the totalizer for addition or subtraction, said means including a pair of cams each being movable from an ineffective position to an effective position, one of said cams being operable to shift the totalizer from a neutral to an adding position, and the other of said cams being operable to shift the totalizer from a neutral to a subtracting position, actuating means for said cams including a member shiftable to select one cam or the other for actuation, said member being operatively connectable to the selected cam for moving the cam between its ineffective and effective positions and portions on the member acting during the movement of the member into operative connection between the selected cam and the member, for restoring the non-selected cam to ineffective position.

3. In an accounting machine operable in cycles, the combination of a totalizer shiftable from a neutral position to an add or to a subtract position in one cycle, and back to neutral position and thence to a subtract or add position in a next cycle, two cams each oscillatable once to an operated position and a restored position in two cycles of the machine, means operatively connecting said totalizer to said cams so that oscillation of one cam shifts the totalizer between neutral and add positions and oscillation of the other cam shifts the totalizer between neutral and subtract positions, a cam operator oscillatable once in each cycle, portions on said operator operable during the movement of said operator in its movement in one direction to restore either cam from operated position and an operative connection between said operator and cams shiftable to enable the operator in its opposite movement to move one or the other cam to such operated position.

4. In an accounting machine operable in cycles, an addition-setting device, a subtraction-setting device, one of said devices normally being in operated position and the other being in a restored position, an operator for said devices reciprocable once in a cycle, and connecting means, between said operator and devices, including a shiftable part having a pawl and ratchet-like operative connection with one or the other of said devices depending on the shift of said part, said connecting means being constructed so that movement of the operator in one direction may move either device, irrespective of said shift, to restored position and so that movement of the operator in the other direction may move the other device to operated position.

5. In a machine of the class described, a traveling carriage, a plurality of totalizers, means to shift the totalizers for addition and subtraction, said means including a pair of cams, each being movable from an ineffective position to an effective position, one of said cams being operable to shift any totalizer to adding position, and the other of said cams being operable to shift any totalizer to subtracting position, means for actuating said cams including a shiftable member selectively and operatively connectable with either cam to move the selected cam from its ineffective to its effective position, portions on the member for restoring the unselected cam to ineffective position during the movement of the member toward operative connection with the selected cam, and means under the control of the carriage for controlling the shifting of the member to select one cam or the other for operation.

6. In a machine of the class described, a traveling carriage, a plurality of totalizers, means to shift the totalizers for addition and subtraction, said means including a member reciprocable in one direction from normal for addition, and reciprocable in another direction from normal for subtraction, a pair of cams, each being movable from an ineffective to an effective position and operatively connectable to said member for imparting such reciprocable movement to the member, an arm for imparting movement to said cams, a slide on said arm for normally connecting said arm with one of said cams, means under the control of the traveling carriage for shifting the slide from connection with one of the cams into position for connection with the other cam, and portions on the slide for restoring said one cam to ineffective position during movement of the slide in a direction to effect a connection between the slide and said other cam.

OSCAR J. SUNDSTRAND.